United States Patent [19]

Ehrhart et al.

[11] Patent Number: 4,793,125
[45] Date of Patent: Dec. 27, 1988

[54] FRAME FOR WINDROW INVERTER

[75] Inventors: Philip J. Ehrhart, Narvon; Bryant F. Webb, Ephrata, both of Pa.

[73] Assignee: Ford New Holland, Inc., New Holland, Pa.

[21] Appl. No.: 99,823

[22] Filed: Sep. 23, 1987

[51] Int. Cl.⁴ .................... A01D 57/12; A01D 78/16
[52] U.S. Cl. ........................................ 56/16.1; 56/370; 56/364
[58] Field of Search .............. 56/192, 364, 15.7, 15.8, 56/15.9, 16.1, 16.3, 372, 370, 375

[56] References Cited

U.S. PATENT DOCUMENTS

| | | | |
|---|---|---|---|
| 2,529,577 | 11/1950 | Schempp et al. | 56/370 |
| 2,636,335 | 4/1953 | Whitney | 56/370 |
| 2,751,745 | 6/1956 | Magee | 56/364 |
| 2,761,270 | 9/1956 | Plaser et al. | 56/370 |
| 3,159,959 | 12/1964 | Mathews | 56/15.7 |
| 3,496,713 | 2/1970 | Reinhardt et al. | 56/370 |
| 3,690,055 | 9/1972 | Reber | 56/370 |
| 4,471,605 | 9/1984 | Ender, Sr. | 56/372 |

FOREIGN PATENT DOCUMENTS 1582167  6/1982  Fed. Rep. of Germany ........ 56/370

Primary Examiner—John Weiss
Attorney, Agent, or Firm—Larry W. Miller; Frank A. Seemar; Darrell F. Marquette

[57] ABSTRACT

A frame for a machine operable to invert and laterally displace a windrow of crop material is disclosed wherein the frame includes a support portion having a windrow pickup mechanism and a windrow inversion mechanism mounted thereon and being mobilely supported over the ground by a pair of ground wheels. The frame also includes a hitch portion pivotally connected to the support portion for articulation about a transversely extending horizontal pivot axis. A latching mechanism is operable to interengage the hitch and support portions of the frame to positionally fix the pivotal motion therebetween to lock the frame into an elevated transport position. The hitch and support portions are free to pivotally move relative to one another during operation to permit the pickup mechanism to floatingly follow the contours of the ground. Tension springs interconnecting the hitch and support portions of the frame provide flotational characteristics for the pickup mechanism by biasing the frame components toward the raised transport position.

7 Claims, 4 Drawing Sheets

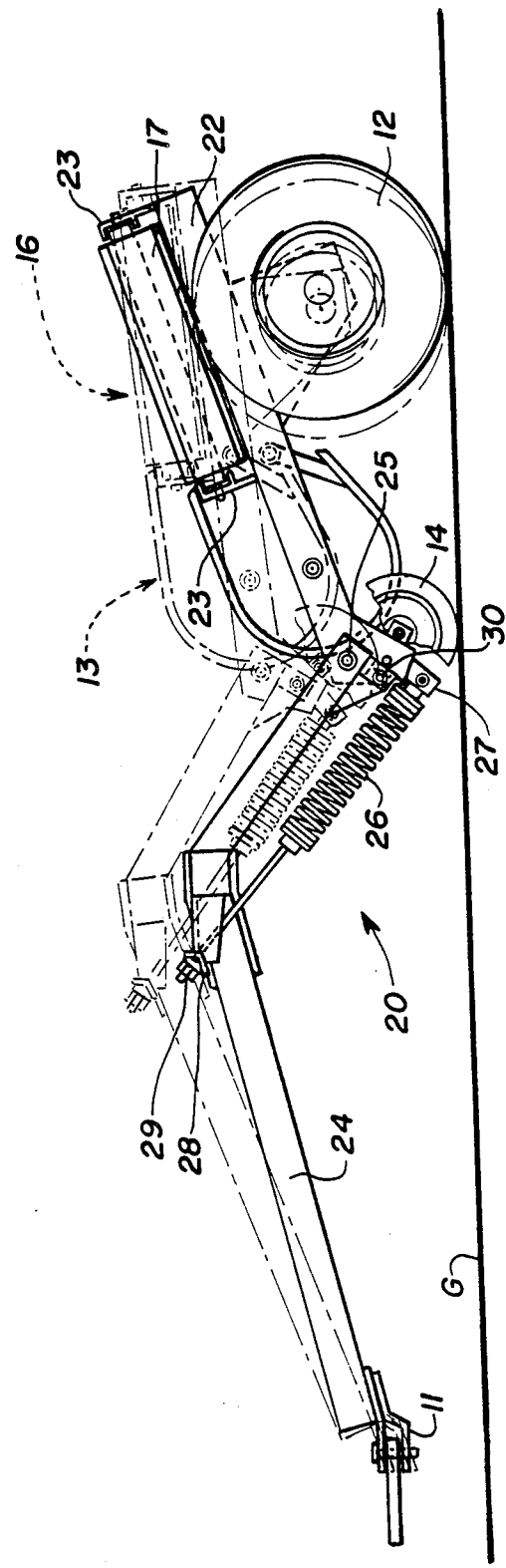

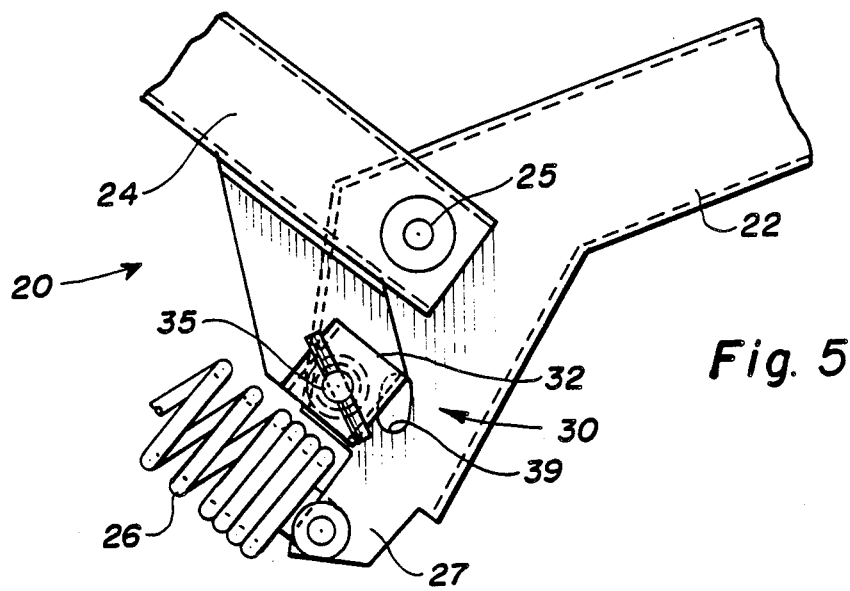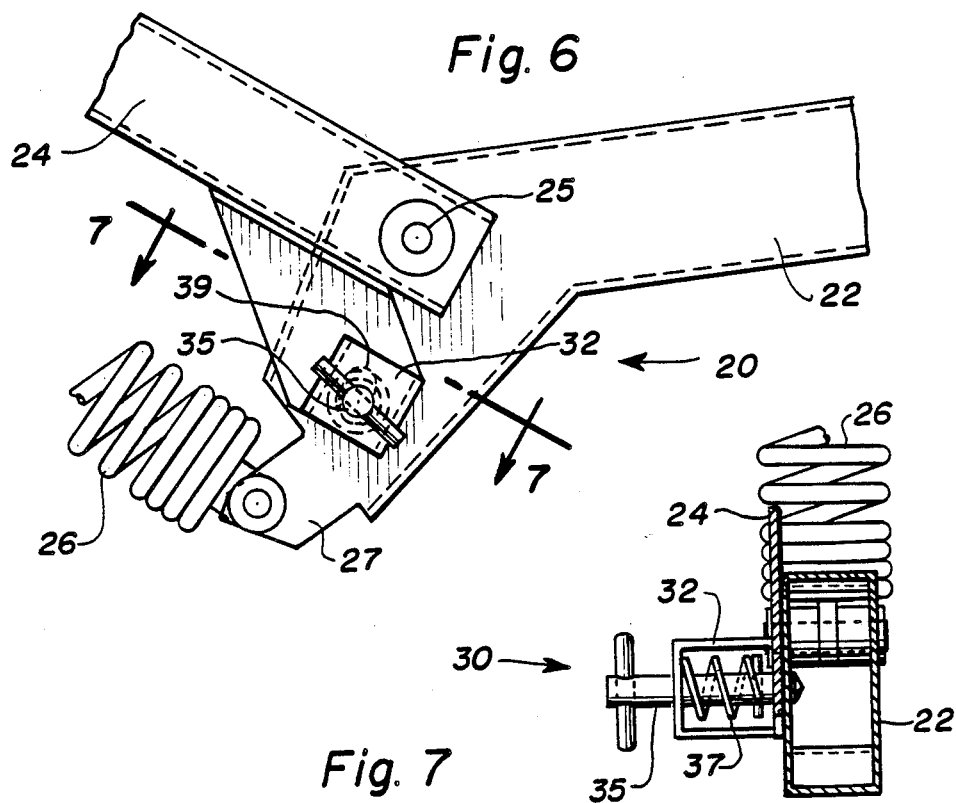

FRAME FOR WINDROW INVERTER

BACKGROUND OF THE INVENTION

The present invention relates generally to crop harvesting machines and, more particularly, to a frame for a pull-type machine operable to work windrows of crop material.

Pull-type crop harvesting machinery typically are provided with support frames having a tongue or hitch member pivotally connected thereto for movement about a generally vertically extending axis. This particular structure permits the crop harvesting machine to be laterally moved relative to the primer mover or tractor between transport and operative positions. Other crop harvesting machines, such as those pulled directly behind the tractor, have been provided with stationary frames extending from the hitch member to the support wheels. Because of the low cost nature of machines for inverting windrows of crop material, it is desirable to provide a frame for such a machine that will minimize weight and, therefore, cost, as well as maintain the frame strength. While lateral movement of the machine is not necessary, flotational characteristics to permit the pickup mechanism to follow change in ground contours is required.

SUMMARY OF THE INVENTION

It is an object of this invention to overcome the aforementioned disadvantages of the prior art by providing an articulated frame member having a hitch portion pivotally connected to a support portion.

It is a feature of this invention that the pivot axis permitting articulation between hitch and support portions of the frame is oriented horizontally and transversely to the direction of travel.

It is an advantage of this invention that the articulated frame can be positioned in a raised transport position to elevate the pickup mechanism above the ground.

It is another object of this invention to provide a latching mechanism interengageable between the hitch and support portions of the frame to lock the articulation of the frame into the raised transport position.

It is another feature of this invention that the latching mechanism permits a free articulation between the hitch and support portions of the frame during operation thereof.

It is another advantage of this invention that the articulation between the hitch and support portions of the frame permit the pickup mechanism to follow changing ground contours.

It is yet another object of this invention to provide a flotation mechanism interconnecting the hitch and support portions to permit an adjustment of the weight of the pickup mechanism on the ground during operation of the machine.

It is still another feature of this invention that the flotation mechanism can utilize tension springs to urge the articulation between the hitch and support portions of the frame toward the raised transport position.

It is still another advantage of this invention that the tension flotation springs facilitate machine set up and flotation adjustment.

It is yet another feature of this invention that the latching mechanism utilizes a spring loaded latch pin carried by the hitch portion and biased toward engagement with a mating hole in the support of the frame.

It is yet another advantage of this invention that the flotation mechanism permits a manual lifting of the frame components to manipulate the articulation of the hitch and support portions of the frame into the raised transport position.

It is a further object of this invention to provide a frame for a windrow inverter which is durable in construction, inexpensive of manufacture, carefree of maintenance, facile in assemblage, and simple and effective in use.

These and other objects, features and advantages are accomplished according to the instant invention by providing a frame for a machine operable to invert and laterally displace a windrow of crop material wherein the frame includes a support portion having a window pickup mechanism and a window inversion mechanism mounted thereon and being mobilely supported over the ground by a pair of ground wheels. The frame also includes a hitch portion pivotally connected to the support portion for articulation about a transversely extending horizontal pivot axis. A latching mechanism is operable to interengage the hitch and support portions of the frame to positionally fix the pivotal motion therebetween to lock the frame into an elevated transport position. The hitch and support portions are free to pivotally move relative to one another during operation to permit the pickup mechanism to floatingly follow the contours of the ground. Tension springs interconnecting the hitch and support portions of the frame provide flotational characteristics for the pickup mechanism by biasing the frame components toward the raised transport position.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 4 is a left side elevational view of the frame seen in FIG. 2 in the lowered operating position, the raised transport position being shown in phantom;

FIG. 5 is an enlarged detail view of the articulation area between the hitch and support portions of the frame as seen in FIG. 4, the position of the frame being in the lowered operating position;

FIG. 6 is an enlarged detail view similar to that of FIG. 5 with the hitch and support portions of the frame being articulated into the raised transport position; and FIG. 7 is a cross-sectional view taken along lines 7—7 of FIG. 6 to show the details of the latching mechanism blocking the frame portions in the raised transport position.

DETAILED DESCRIPTION OF THE PREFERRED EMBODIMENT

Figure 1:
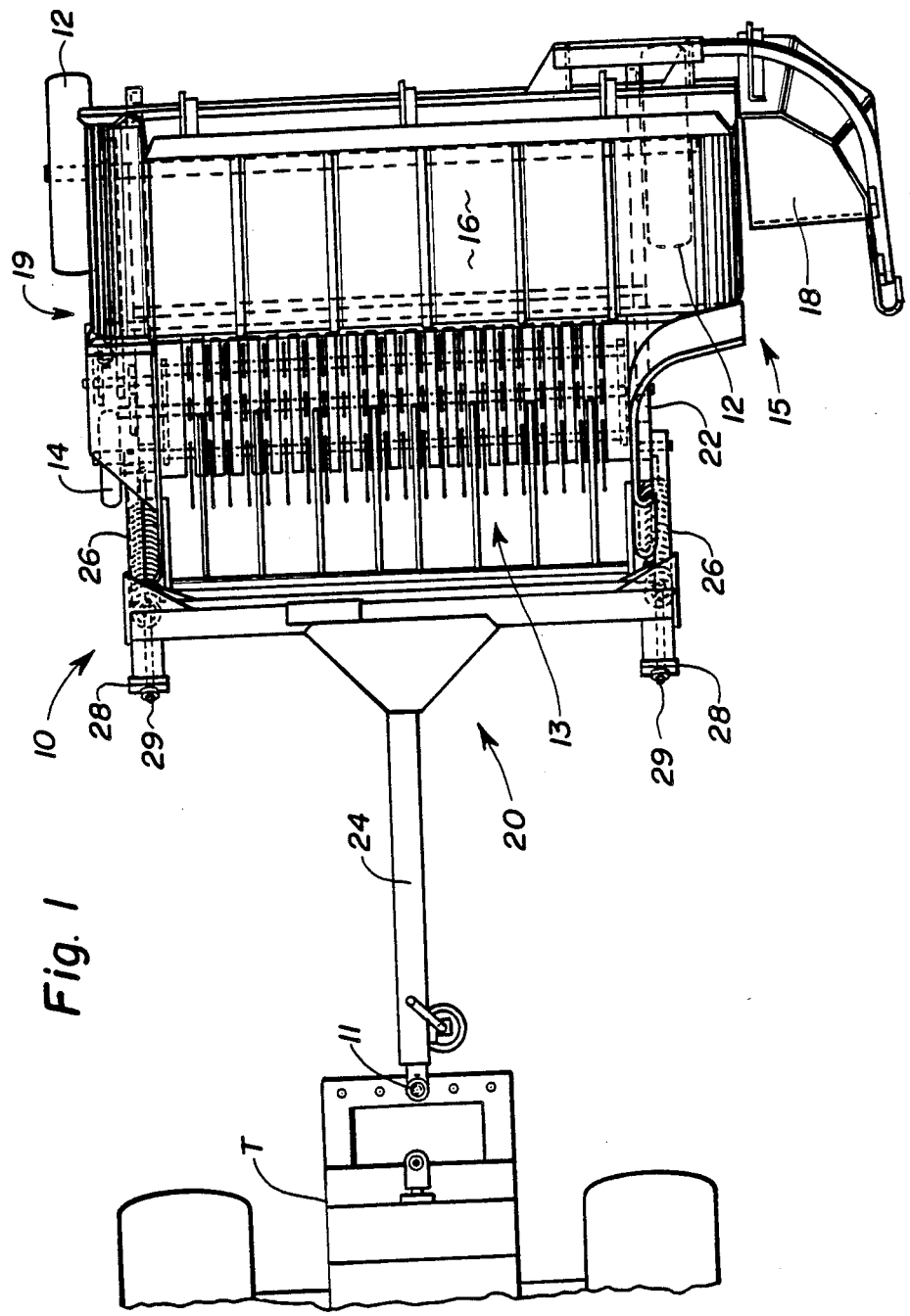
FIG. 1 is a top plan view of the windrow inverter hitched to a prime mover.

Referring now to the drawings and, particularly, to FIGS. 1–4, a top plan and elevational views of a crop harvesting machine commonly referred to as a windrow inverter can be seen. Any left and right references are used as a matter of convenience and are determined by standing at the rear of the machine, facing the forward end of the machine attached to the prime mover, looking in the direction of travel. The windrow turner 10 is a pull-type implement connectable to a tractor T to provide power for movement over the field. The windrow turner 10 is mobilely supported on the ground G by a pair of ground wheels 12. A forwardly positioned hitch member 11 permits the machine 10 to be connected to the tractor T.

The windrow turner 10 utilizes a rotating tine pickup mechanism 13 to engage the windrow on the ground G and elevate it onto a windrow inversion mechanism 15 in the form of an endless draper cross conveyor 16, rotatable in a direction transverse to the direction of travel, and a discharge chute 18 positioned at the end of the cross conveyor 16 to receive the windrow conveyed thereby. A windrow lying on the ground will be elevated by the pickup mechanism 13 unto the cross conveyor 16 where it is conveyed laterally of the direction of travel. The windrow is discharged from the end of the cross conveyor 16 into the discharge chute 18 which directs the flow of the windrow in a forward direction for discharge to the ground laterally spaced from its original location on the ground. The forward motion of the windrow turner 10 affects a tumbling of the windrow from the discharge chute 18 and causes the windrow to be inverted from its original orientation. A damp side adjacent the ground prior to being engaged by the pickup mechanism 13 will be positioned on the top of the windrow after discharge from the discharge chute 18. A ground drive mechanism 19 transfers rotational power from the ground wheel 12 to operably power the rotation of the pickup mechanism 13 and the draper cross conveyor 16.

Figure 2:
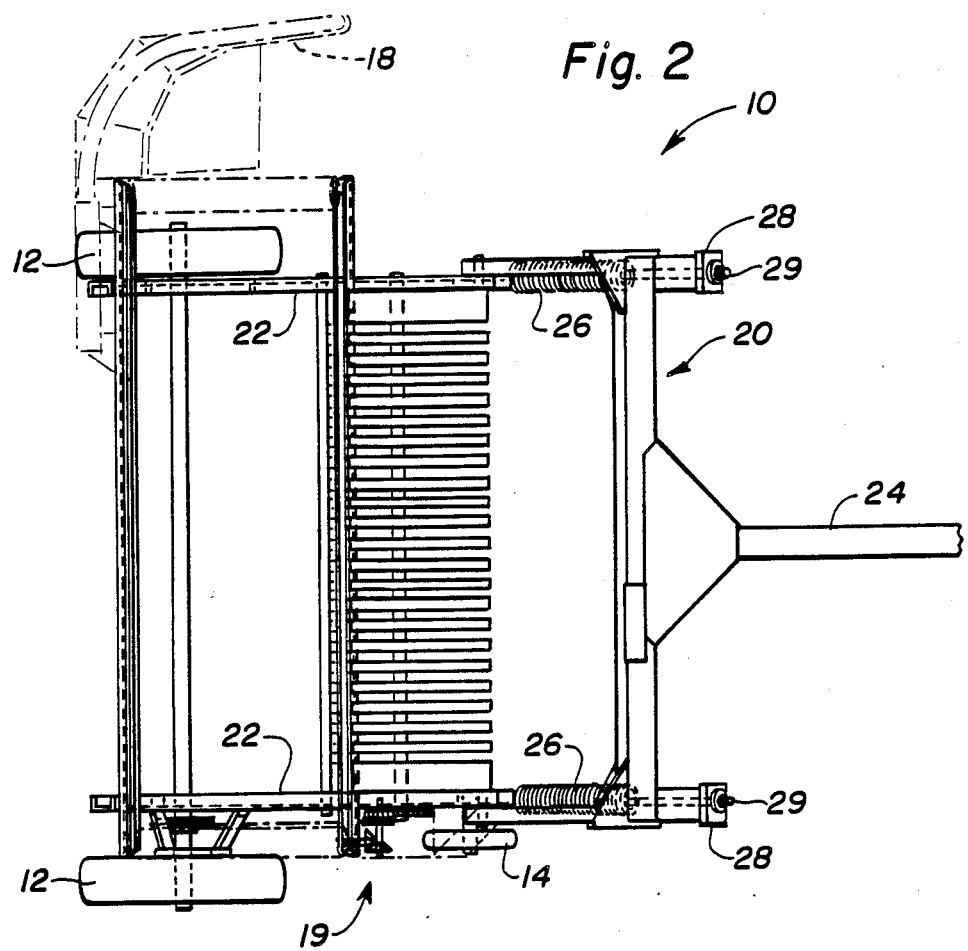
FIG. 2 is a top plan view of the windrow inverter frame with the pickup and cross conveyor mechanisms removed, the position of the discharge chute being shown in phantom.
Figure 3:
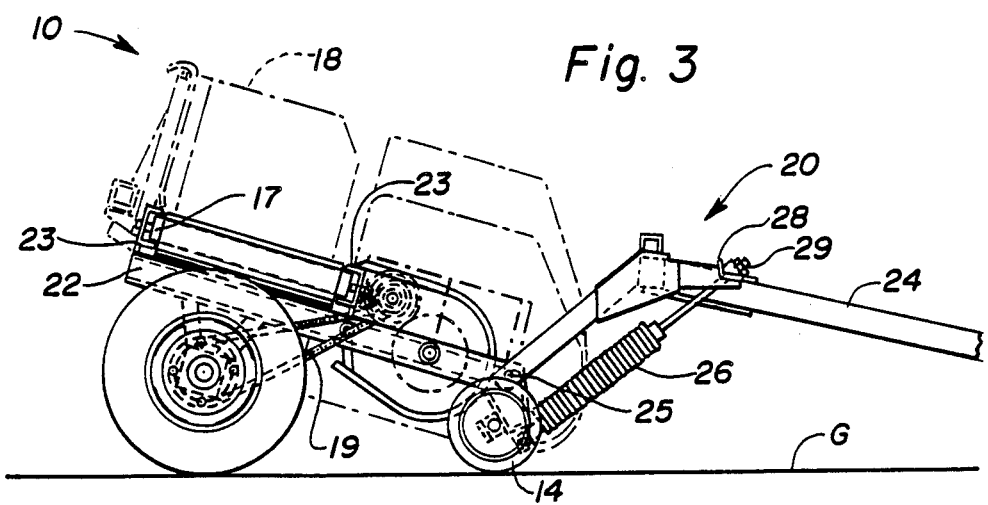
FIG. 3 is a right side elevational view of the frame shown in FIG. 2 with the sheet metal and discharge chute components being shown in phantom, the frame being depicted in its lowered operating position.

The frame 20 of the windrow turner 10 can best be seen in FIGS. 2-4. The frame 20 includes a support portion 22 upon which the pickup mechanism 13 and the cross conveyor 16 are mounted. In addition, the support portion 22 of the frame 20 carries the ground wheels 12. The rollers 17 about which the draper cross conveyor 16 is entrained are journalled in brackets 21 extending upwardly from the support portion 22 of the frame 20.

A forward hitch portion 24 of the frame 20 is pivotally connected to the support portion 22 at its rearward end for articulation relative thereto about a generally horizontal pivot axis 25 extending transverse to the direction of travel. The forward end of the hitch portion 24 is equipped with the hitch member 11 for connection to the tractor T. The articulation between the forward hitch portion 24 and the rearward support portion 22 permits the frame 20 to be positioned in a lowered operating position, as shown in solid lines in FIG. 4, and in elevated transport position as shown in phantom in FIG. 4. When the frame 20 is in a lowered operating position, gauge wheels 14 operatively associated with the pickup mechanism 13 are engaged with the ground G to limit the downward movement of the frame 20. The gauge wheels 14 are adjustably mounted on the support portion of the frame 20 to permit an adjustment of the height of the pickup mechanism 13 relative to the ground G.

To facilitate the ability of the pickup mechanism 13 to follow changing ground contours, the frame 20 is provided with flotation springs 26 interconnecting a tab 27 on the support portion 22 and a bracket 28 on the hitch portion 24. The flotation springs 26 are tension springs, the length of which is adjustable in a conventional manner by an adjustment bolt 29. The biasing force exerted by the flotation springs 26 urges the articulation of the support portion 22 and hitch portion 24 toward the raised transport position, thereby minimizing the weight of the windrow turner 10 upon the gauge wheels 14 and permitting the pickup mechanism 13 to more easily follow changing ground contours.

As best seen in FIGS. 5-7, a latching mechanism 30 is provided to lock the articulated frame 20 in the raised transport position. A housing 32 mounted on the hitch portion 24 of the frame 20 carries a latch pin 35 spring-loaded by the spring 37 mounted within the housing 32 to urge the latch pin 35 toward engagement with the support portion 22. As best seen in FIG. 5, the position of the support and hitch portions 22,24 of the frame 20 is such that the latch pin 35 rides on the support portion 22 whenever the frame is in its lowered operating position, permitting the hitch and support portions 24,22 to freely articulate. However, once the frame 20 has been elevated into the transport position, the articulation between the hitch portion and the support portion 22 swings the latch pin 35 into engagement with a mating hole 39 in the support portion 22. The insertion of the latch pin 35 through the hole 39 locks the articulation of the frame 20 and, thereby, fixes the frame 20 in its transport position.

The flotation springs 26 exert sufficient biasing force between the hitch portion 24 and the support portion 22 that the operator can easily lift the frame 20 manually into its transport position at which time the spring-loaded latch pin 35 will automatically insert into the mating hole 39. When it is desirable to return the frame 20 into its lowered operating position, the operator must overcome the biasing force exerted by the spring 37 and retract the latch pin 35 from the hole 39 while permitting the frame 20 to be lowered from the transport position to the operating position. The resulting articulation about the pivot axis causes the latch pin 35 to engage solid metal of the support portion adjacent the hole 39, permitting the hitch portion 24 to articulate freely relative to the support portion 22.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the spirit of the invention. Accordingly, the following claims are intended to protect the invention broadly as well as in the specific form shown.

Having thus described the invention, what is claimed is:

1. In a windrow inverter having a mobile frame adapted for movement over the ground along a forward direction of travel; pick-up means supported from said frame for engagement of a windrow of crop material lying on the ground and elevating said windrow above the ground; and windrow inversion means supported on said frame for receiving an elevated windrow of crop material from said pick-up means, inverting said windrow and depositing said inverted windrow on the ground, an improved frame comprising:

a support portion having wheels mounted thereto for mobilely supporting said frame above the ground, said support portion having said pick-up means and said windrow inversion means mounted thereto;

a hitch portion pivotally connected to said support portion for articulation about a horizontal pivot axis extending perpendicular to the direction of travel, said hitch portion terminating in a forward hitch member for connection to a prime mover; and latching means interengaging said support portion and said hitch portion for selectively fixing the relative articulated positions between said support portion and said hitch portion.

2. The windrow inverter of claim 1 wherein said frame is positionable in a raised transport position and a lower operating position, said latching means being operable to lock said frame in said transport position.

3. The windrow inverter of claim 2 wherein said pick-up means is provided with gauging means for engaging the ground and maintaining the position of said pick-up means relative to the ground, said gauging means engaging the ground when said frame is in said operating position, said latching means permitting said hitch portion to pivotally move relative to said support portion when said frame is in said operating position so that said pickup means can follow the surface of the ground through articulation of said frame.

4. The windrow inverter of claim 3 further comprising flotation springs interconnecting said hitch portion and said support portion, said flotation springs exerting a biasing force urging a pivotal movement between said hitch portion and said support portion toward said raised transport position.

5. The windrow inverter of claim 4 wherein said latching means includes a springloaded pin carried by one portion of said frame and biased toward engagement with an opening in the other portion of said frame, the engagement of said pin with said opening corresponding to the placement of said frame in said transport position.

6. The windrow inverter of claim 5 wherein said pin presses against said other portion of said frame when said frame is in said operating position without significantly restricting the articulation between said frame portions.

7. The windrow inverter of claim 4 wherein said flotation springs are tension springs.

* * * * *